No. 646,563. Patented Apr. 3, 1900.
A. SMITHSON, G. A. L. McINDOO & W. T. PERRY.
VEHICLE.
(Application filed Aug. 4, 1899.)
(No Model.)

WITNESSES:
D. E. Carlsen.
E. C. Carlsen

INVENTORS:
Arthur Smithson,
George A. L. McIndoo,
William T. Perry.
BY their ATTORNEY: A. M. Carlsen

THE NORRIS PETERS CO., PHOTO-LITHO., WASHINGTON, D. C.

UNITED STATES PATENT OFFICE.

ARTHUR SMITHSON, GEORGE A. L. McINDOO, AND WILLIAM T. PERRY, OF SEDAN, MINNESOTA; SAID PERRY ASSIGNOR TO SAID SMITHSON AND McINDOO.

VEHICLE.

SPECIFICATION forming part of Letters Patent No. 646,563, dated April 3, 1900.

Application filed August 4, 1899. Serial No. 726,131. (No model.)

*To all whom it may concern:*

Be it known that we, ARTHUR SMITHSON, GEORGE A. L. McINDOO, and WILLIAM T. PERRY, citizens of the United States, residing at Sedan, in the county of Pope and State of Minnesota, have invented certain new and useful Improvements in Vehicles; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to improvements in vehicles, and is in part especially adapted for use on lumber-wagons and other heavy wagons.

The objects of our invention are, first, to provide a wagon with a novel extensible reach; second, to provide a wagon with such connection between the front and rear axles that the hind wheels will travel in the tracks of the front wheels when the wagon is driven to either side, as well as when driving on a straight road; third, to make such reach and connection extensible; fourth, to provide a wagon which may properly be used with either end as the front end. These and other objects we attain by the novel construction and arrangement of parts illustrated in the accompanying drawings, in which—

Figure 1:
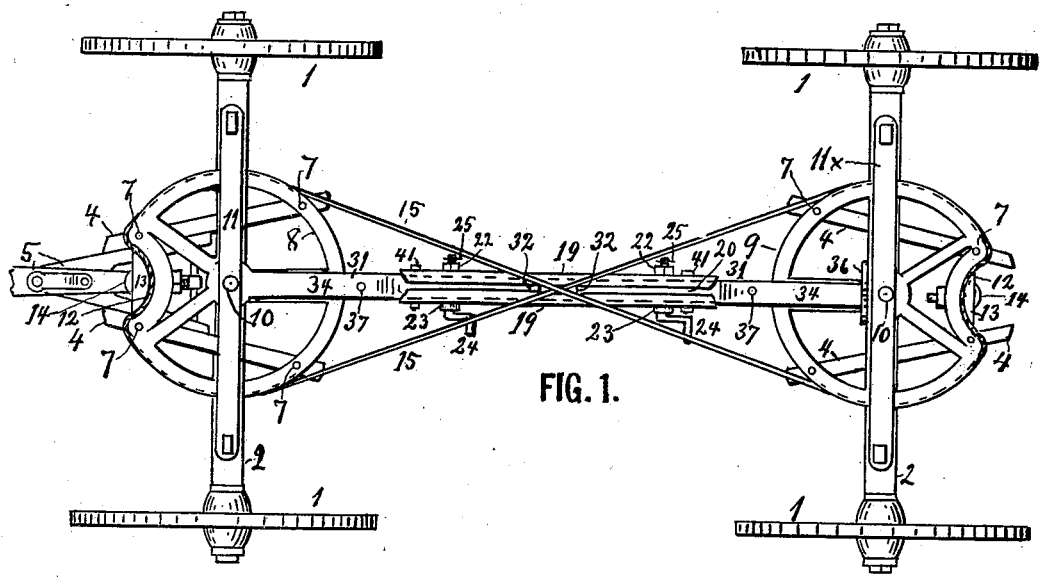
Figure 2:
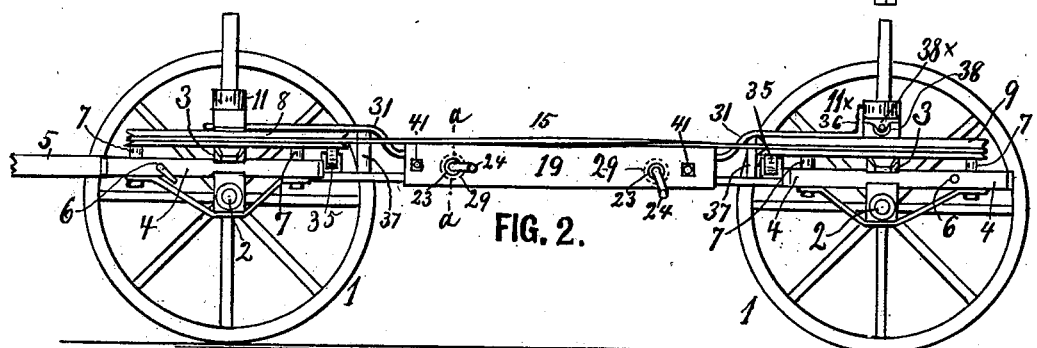
Figure 3:
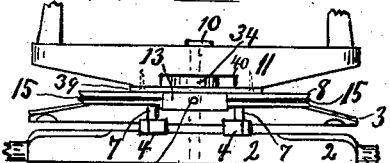
Figure 4:
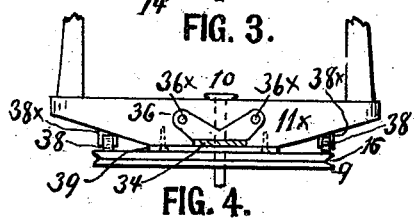
Figure 5:
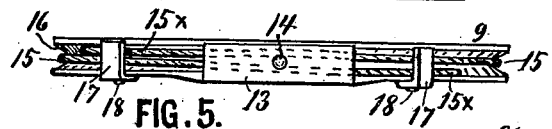
Figure 6:
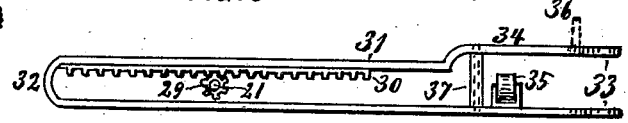
Figures 7, 8:
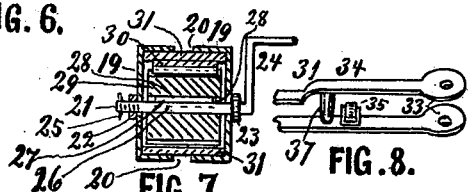

Figure 1 is a top or plan view of our improved wagon or a lumber-wagon with our improvements applied to it. Fig. 2 is a side elevation of Fig. 1 with the left-side wheels of the wagon removed. Fig. 3 is a front end view of the truck or body of the wagon with the pole or tongue 5 omitted. Fig. 4 is a front view of the rear bolster and the parts secured below and in front of it. Fig. 5 is an enlarged view of the rear edge of what we for clearness sake will call the "rear" fifth-wheel 9, although it is the front one when the wagon is reversed or used with that end to the front. Fig. 6 is a detail side view of a portion of the reach. Fig. 7 is a cross-section of the reach on the line $a\,a$ in Fig. 2. Fig. 8 is a perspective view of the right-hand end portion of Fig. 6.

Referring to the various parts by reference-numerals, 1 shows the carrier-wheels, 2 the axles, and 3 the sand-boards, of an ordinary lumber-wagon. Between said axles and sand-boards we secure the hounds 4, one pair at each end of the wagon, so that the pole or tongue 5 may be inserted and secured by the pin 6 in the usual manner in either pair of the hounds. Upon the sand-boards 3 and the studs 7 projecting up from the hounds are secured the peripherically-grooved fifth-wheels 8 and 9, upon which rest and swivel on the king-bolts 10 the bolsters 11 and $11^\times$. Each of said fifth-wheels is provided in its outer or endward edge with a notch 12, in which is held by the bolt 14 and clamping-block 13 the chain, or preferably wire rope 15, which crosses itself near the middle of the wagon, and, lying in the peripherical grooves 16 of the fifth-wheels, is there securely held as a single rope by the clamp 13 on the fifth-wheel 8, while on the fifth-wheel 9 the ends $15^\times$ of the rope are secured by the clamp, one above and the other below the bolt 14, (see Fig. 5,) so that the ends of the rope overlap each other and may be moved under said clamp, according as the reach and the rope are lengthened or shortened for hauling long or short lumber.

17 are clamps or guides to keep the ends of the rope and the rope itself when slackened in position in the grooves 16. These clamps are secured by the bolts or screws 18 to the fifth-wheels and may be of any desired number.

The reach consists of two parallel channeled or grooved strips or plates 19, of sheet-steel or iron. The grooves are turned toward each other, but with a space 20 between their edges. (See Fig. 7.) These grooved plates are adapted to be drawn toward each other by the bolts 21, nuts 22, and heads or collars 23, from which project the cranks 24.

25 is a pin through the end of the bolt to prevent the nut 22 from getting lost when loosened. In the side of the bolt is a keyway 26 holding a key 27, engaging the keyway 28 in the pinion 29, which engages the rack 30, (see Fig. 6,) secured in the yoke 31, of which there are two, slidingly-inserted and clamped between the plates 19, and butting with their ends 32 against each other when the reach is shortened to its limit.

The outer end of the front yoke is secured on the king-bolt 10 by its perforated arms 33 34, (see Figs. 6 and 8,) with the edge of the fifth-wheel guided between the upper arm 34 and the antifriction-roller 35 of the lower arm. The rear yoke has only the lower arm 31 on the king-bolt. The upper arm is bent vertically upward, as in dotted lines 36 in Fig. 6, spread as in Fig. 4, and bolted at 36$^\times$ to the front side of the rear bolster 11$^\times$, so that the latter always retains a transverse position to the yoke of the reach.

37 are studs securing the upper and lower bars of the yoke together, so that they cannot spread for the tilting of the fifth-wheel against them.

38 are antifriction-rollers mounted in suitable brackets 38$^\times$, secured to the under side of the ends of the rear bolster 11$^\times$, which the rollers support as they roll upon the fifth-wheel as on a circular track.

39 is a lining or wearing plate secured underneath the middle portion of each bolster to lessen its wearing upon the fifth-wheel. In the front bolster the upper arm 34 of the yoke is inserted and swings in the notch 40 above said plate.

41 are common bolts, by which the plates 19 may be sufficiently clamped upon the yokes of the reach, or said bolts may be used in addition to those 21, which when loosened may be turned by the cranks 24 until the reach and the wire ropes 15 are of the desired length. Then the nuts 22 are again tightened up, as is also the clamp 13, by the bolt 14 upon the end portions of the rope.

From the above description it will be seen and understood that in operation the reach and the rope or ropes 15 are easily extended and adjusted by the cranks 24 and pinions 29 and the clamping-bolts 14, 21, and 41, and as the rope crosses between the two fifth-wheels the turning or driving of the front wheels to one side will cause the hind axle and wheels to carry the rear end of the wagon in the opposite direction, and thereby greatly facilitate turning to either side with the wagon. The crossed rope also causes the hind wheels to run in the very tracks of the front wheels during any turning sidewise, and this is a great advantage over ordinary wagons, in which the driving to either side causes the hind wheels to make a smaller curve than the front wheels, and thereby often meet obstructions, which cause delay and accident. Another advantage is the cheapening of the wagon by having the hind wheels as small as the front wheels, which is only practical in our wagon, where the hounds and fifth-wheel on the rear axle compensate for the greater height of hind wheels on common wagons. The two sets of hounds also enable the pole to be readily moved to the rear end of the wagon, which is quite often desirable when the wagon either gets into a small yard or other narrow places or its front wheels get into soft ground or other obstructions, from which backing out is advisable or necessary.

The main principles of our invention may be applied to mostly any kind of four-wheeled vehicles and even to bob-sleds. We therefore do not wish or mean to confine the use of our invention or improvements in vehicles to any special type or types of the same, but mean to apply the improvements wherever they can be applied.

Having thus described our invention, what we claim, and desire to secure by Letters Patent, is—

1. A four-wheeled vehicle having two, peripherically-grooved fifth-wheels, each with a continuous, substantially-circular ring, one secured upon each axle, a chain or wire rope passed continuously about and secured to the fifth-wheels, lying in their grooves, and crossing between the two fifth-wheels, and a suitable, extensible reach holding the fifth-wheels apart and the rope stretched, substantially as set forth.

2. In a four-wheeled vehicle, the combination with the front and rear axles thereof, of two fifth-wheels, one secured upon each axle and having a continuous ring with a notch in its periphery, a bolster pivoted on a king-bolt passed down centrally through each fifth-wheel, a reach, extensible in its middle and pivotally secured with one end on one of the king-bolts, and with the other end pivotally secured on the other king-bolt, and rigidly secured to the adjacent bolster at a right angle with the same, two extensible strands of wire rope crossing each other near the middle of the vehicle, and being secured permanently to one of the fifth-wheels and adjustably to the other one of them, by the clamping-blocks 13 and bolts 14 in the said peripherical notches, substantially as and for the purpose set forth.

3. A vehicle having a reach consisting of two horizontally-bifurcated bodies or yokes, clamping plates and bolts holding the yokes in line with one another; the upper and lower bars of each yoke being extended beyond the clamping-plates and secured to the king-bolt, one above the fifth-wheel and the other below it near the axle.

4. A four-wheeled vehicle having a reach consisting of two yokes 31, secured with their outer ends on or to the front and rear axles or parts of the vehicle, and having their inner ends butting against each other, the two guiding and clamping plates 19, housing the adjacent ends of the yokes, and having bolts extending transversely through the plates and the yokes, for clamping the yokes at various points of extension between the plates, substantially as set forth.

5. A four-wheeled vehicle having a reach constructed of two yokes 31, secured with their outer ends to the front and rear axles or other portions of the wagon, and having their inner ends butting against each other, the two guiding and clamping plates 19, housing the adjacent ends of the yokes, and bolts extending through the plates and the yoke, for clamping the yokes between the plates; one or both of said yokes having a rack as 30, the pinion 29 engaging the rack and having a shaft journaled in the plates 19, and provided with means for turning it, substantially as and for the purpose set forth.

6. In a four-wheeled vehicle, the reach consisting of two grooved plates secured together with transverse bolts, and two yokes clamped between the said plates, butting together in the middle of the plates with their inner ends, while the outer ends are adapted to be secured to the front and rear portions of the vehicle; one or both of said yokes having a rack, and one or more of the bolts holding the plates together, having the pinion 29 secured upon it and engaging the rack, and the collar 23, nut 22 and crank 24, and means for retaining the nut on the bolt when loosened, substantially as and for the purpose set forth.

7. In a four-wheeled vehicle, the combination with the front and rear axles, of a peripherically-grooved fifth-wheel secured upon each of them and having the opposite notches 12 with the clamping-bolts 14 and blocks 13 therein, a chain or wire rope passed about the fifth-wheels in the manner of a cross-belt, and having its middle portion secured by one of the clamps 13, and its ends adjustably secured by the other clamp 13, substantially as and for the purpose set forth.

8. In a vehicle, the combination with a fifth-wheel of a bifurcated reach, straddling the edge of the fifth-wheel and being securable to the king-bolt in the center thereof; the lower arm of the bifurcated portion of the reach having an antifriction-roller supporting the edge or lower side of the fifth-wheel, substantially as set forth.

9. In a vehicle, the reach consisting of two yokes, each of which is bifurcated substantially its entire length, into an upper and a lower bar, which are some distance apart, to give more resistance to vertical pressure, and means for securing the yokes together, substantially as set forth.

10. A vehicle having a reach consisting of two clamping-plates bolted together, and two yokes clamped with their adjacent ends between said plates; said yokes being each made of an upper and a lower bar, secured together some distance apart, to insure vertical strength, and said bars being flat and wide horizontally, to insure strength against horizontal strain, substantially as set forth.

11. A vehicle having one or more fifth-wheels like 8 or 9, with the notch 12, clamp 13 and clamping-bolt 14 holding the clamp in the notch, substantially as and for the purpose set forth.

In testimony whereof we affix our signatures in presence of two witnesses.

ARTHUR SMITHSON.
GEORGE A. L. McINDOO.
WILLIAM T. PERRY.

Witnesses:
ANDREW QUITNEY,
F. L. BRADLEY.